(12) United States Patent
Weber et al.

(10) Patent No.: US 12,487,138 B2
(45) Date of Patent: Dec. 2, 2025

(54) SENSOR MODULE AND METHOD FOR PROVIDING A SENSOR MODULE SIGNAL

(71) Applicant: Vitesco Technologies GmbH, Regensburg (DE)

(72) Inventors: Christian Weber, Munich (DE); Eric Poyet, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 462 days.

(21) Appl. No.: 17/613,196

(22) PCT Filed: May 18, 2020

(86) PCT No.: PCT/EP2020/063865
§ 371 (c)(1),
(2) Date: Nov. 22, 2021

(87) PCT Pub. No.: WO2020/234255
PCT Pub. Date: Nov. 26, 2020

(65) Prior Publication Data
US 2022/0307932 A1    Sep. 29, 2022

(30) Foreign Application Priority Data
May 23, 2019 (DE) .................... 10 2019 207 549.5

(51) Int. Cl.
*G01L 19/00* (2006.01)
(52) U.S. Cl.
CPC ................ *G01L 19/0092* (2013.01)
(58) Field of Classification Search
CPC ............... G01L 19/0092; G01D 3/08
(Continued)

(56) References Cited

U.S. PATENT DOCUMENTS 5,347,476 A * 9/1994 McBean, Sr. .......... G01D 3/022
73/1.88
9,702,742 B2 * 7/2017 Reimann ................ G01D 21/00
(Continued)

FOREIGN PATENT DOCUMENTS

DE     102 42 128         3/2004    ............. G01D 18/00
DE     10242128 A1 *      3/2004    ............... G01D 3/08
(Continued)

OTHER PUBLICATIONS

European Office Action, Application No. 20726435.9, 7 pages, Oct. 5, 2023.
(Continued)

*Primary Examiner* — Marrit Eyassu
(74) *Attorney, Agent, or Firm* — Slayden Grubert Beard PLLC

(57) ABSTRACT

Various embodiments include a sensor module for providing a sensor module signal comprising information representative of a physical quantity measured by the sensor module. The sensor module may include: a first sensor providing a signal representative of the physical quantity; a first processing device processing the first signal; a second sensor providing a signal representative of the physical quantity; a second processing device processing the second signal; a control device generating the sensor module signal based on the processed first sensor signal and the processed second sensor signal; and a checking device checking the sensor module signal, the processed first sensor signal, and the processed second sensor signal for coherency, and providing a check result signal representative of a result of the check.

10 Claims, 1 Drawing Sheet

(58) Field of Classification Search
USPC .......................................................... 73/714
See application file for complete search history.

(56) References Cited

U.S. PATENT DOCUMENTS

| | | | |
|---|---|---|---|
| 2003/0020487 A1 | 1/2003 | Down | 324/555 |
| 2004/0267424 A1* | 12/2004 | Yao | B62D 5/003 |
| | | | 180/443 |
| 2009/0028160 A1 | 1/2009 | Eswaran et al. | 370/395.32 |
| 2009/0128160 A1 | 5/2009 | Chiaburu | 324/537 |
| 2010/0292885 A1* | 11/2010 | Hiemer | B60R 21/0134 |
| | | | 701/31.4 |
| 2013/0200909 A1* | 8/2013 | Rasbornig | G01R 31/3187 |
| | | | 324/750.3 |
| 2016/0057510 A1* | 2/2016 | Hammerschmidt | H04Q 9/00 |
| | | | 340/870.01 |
| 2016/0084684 A1 | 3/2016 | Granig | G01D 18/00 |
| 2018/0307220 A1* | 10/2018 | Hammerschmidt | |
| | | | G05B 23/0213 |

FOREIGN PATENT DOCUMENTS

| | | | | |
|---|---|---|---|---|
| DE | 10 2015 218 294 | | 3/2016 | ............. G01D 18/00 |
| EP | 3239681 A1 * | | 11/2017 | ............. B81B 7/02 |
| WO | WO-0050862 A1 * | | 8/2000 | ................ G01J 5/02 |

OTHER PUBLICATIONS

Search Report for International Application No. PCT/EP2020/063865, 12 pages, Aug. 5, 2020.
Search Report for DE Application No. 10 2019 207 549.5, 6 pages, Mar. 18, 2020.

* cited by examiner

US 12,487,138 B2

SENSOR MODULE AND METHOD FOR PROVIDING A SENSOR MODULE SIGNAL

CROSS-REFERENCE TO RELATED APPLICATIONS

This application is a U.S. National Stage Application of International Application No. PCT/EP2020/063865 filed May 18, 2020, which designates the United States of America, and claims priority to DE Application No. 10 2019 207 549.5 filed May 23, 2019, the contents of which are hereby incorporated by reference in their entirety.

TECHNICAL FIELD

The present disclosure relates to sensors. Various embodiments include sensor modules and/or methods for providing a sensor module signal comprising information representative of a physical quantity measured by means of the sensor module.

BACKGROUND

Sensor modules for providing a sensor module signal representative of a physical quantity measured by means of the sensor module typically comprise a sensor for providing a sensor signal representative of the physical quantity and a processing device for generating the sensor module signal based on the sensor signal. The signal processing may comprise a calibration of an analog sensor signal, a filtering (e.g. lowpass filtering) and/or an analog/digital conversion of the signal. Such a sensor module can be used for example in a vehicle for measuring physical quantities as e.g. a temperature, a pressure etc.

In modern vehicles, sensor systems with high safety or OBD requirements (self-diagnosis) often use redundant sensor signal acquisition and processing by using two sensors and two processing devices. This technique increases the likelihood that the measured physical quantity (e.g. temperature, pressure etc.) can continue to be observed even with sensor errors. In addition, redundant sensor signal acquisition and processing in some cases allows the detection of errors within the signal chain from each sensor to a receiving device that receives the sensor module signal.

In known sensor modules with redundant sensor signal acquisition and processing, for cost reasons, among other things, the redundant signal paths are often implemented in a common chip or package. Further, a common output stage is usually used, i.e. the redundantly detected and processed sensor signals (comprising at least a first and a second sensor signal) are transmitted on a common (usually digital) signal line to a receiving device. Such an output stage can comprise a control device for generating the (e.g. digital) sensor module signal based on the processed first sensor signal and the processed second sensor signal, and e.g. an output driver that forms an interface for connection of the sensor module to a (e.g. digital) transmission line running to the receiving device.

However, in such sensor modules, an error-free transmission of the plurality of processed sensor signals (comprising first and second processed sensor signals) from the respective internal processing devices to the common control device (output stage), as well as an error-free function of the control device in terms of the generation of the sensor module signal is not reliably ensured. Therefore, it exists a security flaw with respect to errors, which are usually of low probability as compared to other sensor module errors such as a sensor error or a sensor signal processing error. However, the "diagnostic coverage", which can be measured by the receiving device, disadvantageously is zero.

SUMMARY

The teachings of the present disclosure describe sensor modules and methods for providing an (at least one) sensor module signal, by which the above mentioned problems can be avoided. In particular, these teachings may be employed to improve the diagnostic coverage for possible errors in the use of the sensor module and the method, respectively. For example, some embodiments include a sensor module (10) for providing a sensor module signal (OUT) comprising information representative of a physical quantity measured by means of the sensor module (10), comprising: a first sensor (12-1) for providing a first sensor signal (SS1) representative of the physical quantity, a first processing device (20-1) for processing the first sensor signal (SS1) to provide a processed first sensor signal (SS1'), a second sensor (12-2) for providing a second sensor signal (SS2) representative of the physical quantity, a second processing device (20-2) for processing the second sensor signal (SS2) to provide a processed second sensor signal (SS2'), a control device (30) for generating the sensor module signal (OUT) based on the processed first sensor signal (SS1') and the processed second sensor signal (SS2'), a checking device (40) for checking the sensor module signal (OUT), the processed first sensor signal (SS1') and the processed second sensor signal (SS2') for coherency, and for providing a check result signal (EF) representative of a result of the check.

In some embodiments, the first and second sensors (12-1, 12-2) are designed for providing analog signals.

In some embodiments, the first processing device (20-1) comprises a first calibrating amplifier (22-1) for providing an amplified first sensor signal and a first ADC (24-1) for analog/digital conversion of the amplified first sensor signal into a digital first sensor signal, and the second processing device (20-2) comprises a second calibrating amplifier (22-2) for providing an amplified second sensor signal and a second ADC (24-1) for analog/digital conversion of the amplified second sensor signal into a digital second sensor signal.

In some embodiments, the first processing device (20-1) further comprises a first digital processing device (26-1) for digitally processing the digital first sensor signal to provide the processed first sensor signal (SS1'), and the second processing device (20-2) further comprises a second digital processing device (26-2) for digitally processing the digital second sensor signal to provide the processed second sensor signal (SS2').

In some embodiments, each of the first digital processing device (26-1) and the second digital processing device (26-2) is adapted to receive a processing clock signal and has a digital output register for providing the processed first sensor signal (SS1') and the processed second sensor signal (SS2'), respectively, in form of data updated in accordance with the processing clock signal.

In some embodiments, the control device (30) is adapted to generate the sensor module signal (OUT) in form of digital data at least containing a data element representative of the processed first sensor signal (SS1') and a data element representative of the processed second sensor signal (SS2').

In some embodiments, the control device (30) is adapted to generate the sensor module signal (OUT) in form of digital data containing at least one data element representative of the physical quantity measured by means of the sensor module (10) and at least one data element constituting a checksum of the first mentioned data element and/or constituting a running counter.

In some embodiments, the control device (30) is adapted to generate the sensor module signal (OUT) in form of digital data according to the SENT protocol, the CAN protocol or the LIN protocol.

In some embodiments, the checking device (40) is adapted to provide the check result signal (EF) at an output terminal of the sensor module (10), which is provided separate from an output terminal of the sensor module (10) for the sensor module signal (OUT).

As another example, some embodiments include a method for providing a sensor module signal (OUT) comprising information representative of a physical quantity measured by means of a sensor module (10), comprising: providing a first sensor signal (SS1) representative of the physical quantity, processing the first sensor signal (SS1) to provide a processed first sensor signal (SS1'), providing a second sensor signal (SS2) representative of the physical quantity, processing the second sensor signal (SS2) to provide a processed second sensor signal (SS2'), generating the sensor module signal (OUT) based on the processed first sensor signal (SS1') and the processed second sensor signal (SS2'), checking the sensor module signal (OUT), the processed first sensor signal (SS1') and the processed second sensor signal (SS2') for coherency, and providing a check result signal (EF) representative of a result of the check.

BRIEF DESCRIPTION OF THE DRAWINGS

The teachings herein are described in more detail by way of exemplary embodiments with reference to the accompanying drawings, in which.

DETAILED DESCRIPTION

Figure 1:
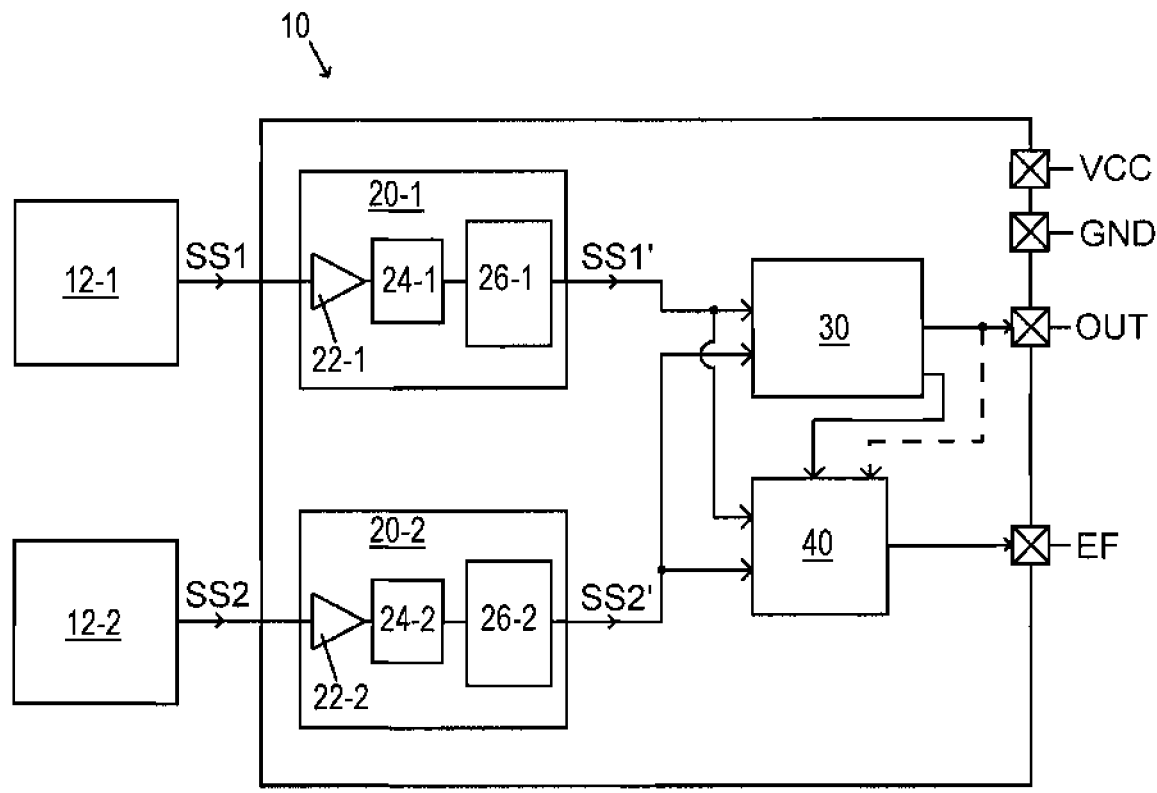
FIG. 1 shows a block diagram of a sensor module incorporating teachings of the present disclosure.

Using the teachings of the present disclosure, it is possible to accomplish a transmission of information originating from a plurality of redundant signal sources (comprising the first and second sensors) via a commonly used transmission line, wherein any errors in the respective information transmission channels remain observable. In some embodiments, the sensor module signal, the processed first sensor signal and the processed second sensor signal are checked for coherency, and a check result signal representative of a result of this check is provided.

Such a coherency means that the generated sensor module signal has plausibility in view of the processed first and second sensor signals, wherein the checking for coherency is foreseen in addition and thusly redundantly to (i.e. independently from) the generation of the sensor module signal.

In some embodiments, there is a redundant measurement of the physical quantity by means of the (at least) first and second sensors, wherein the information about this physical quantity can be transmitted via a common interface (and a common transmission line) to a receiving device, wherein the diagnostic coverage for possible errors is improved. In the sensor module comprising a checking device conducting the coherency check, a further redundancy-generating device is integrated in the sensor module. The checking device can for example be adapted to compare values (e.g. data values) regarding the physical quantities measured by the first and second sensors as generated by the control device and thus to be transmitted with the desired output values (as apparent from the processed first and second sensor signals).

In some embodiments, the check result signal representative of the result of the check is transferable or is transferred to a receiving device via a transmission line independent from a transmission line provided for the sensor module signal. However, both independent transmission lines may run in a commonly used transmission hardware as e.g. an electrical cable.

In some embodiments, the checking device is adapted to provide the check result signal at an (electrical) output terminal of the sensor module, which is provided separate from an (electrical) output terminal of the sensor module used for the sensor module signal.

In some embodiments, the check result signal representative of the result of the check is alternatively or in addition used to modify the sensor module signal. For example, in case of an incoherence detected by means of the check (e.g. by detecting a deviation as a result of the above mentioned comparison), it can be provided to modify the content of a digital sensor module signal by inserting or setting an error flag in a respective data element, or by intentional falsification of a checksum and/or a running counter in a respective data element of the digital sensor module signal.

In some embodiments, in case of an incoherence detected by means of the check, a sending of a current data telegram or future data telegrams is prevented.

In some embodiments, the first and second sensors are designed for providing analog signals as e.g. an analog temperature signal or an analog pressure signal.

In some embodiments, the first processing device comprises a first calibrating amplifier for providing an amplified first sensor signal and a first ADC for analog/digital conversion of the amplified first sensor signal into a digital first sensor signal, and the second processing device comprises a second calibrating amplifier for providing an amplified second sensor signal and a second ADC for analog/digital conversion of the amplified second sensor signal into a digital second sensor signal.

Furthermore, in this case, the first processing device can comprise a first digital processing device for digitally processing the digital first sensor signal to provide the processed first sensor signal, and the second processing device can further comprise a second digital processing device for digitally processing the digital second sensor signal to provide the processed second sensor signal. Therefore, although very widely used analog sensors can be provided in the sensor module, the sensor module can be adapted to provide for a digital processing of the measured information (first and second sensor signals).

In some embodiments, the first and second sensors are designed for providing digital signals. In such case, each of the first and second processing devices can comprise or can be formed by a digital processing device for digitally processing the digital first sensor signal or the digital second sensor signal, respectively, to provide the processed first sensor signal or the processed first sensor, respectively.

In some embodiments, the digital processing comprises a filtering, e.g. lowpass filtering. When the first and second sensors are designed for providing analog signals, each of the above mentioned first digital processing device and second digital processing device is adapted to receive a processing clock signal and has a digital output register for providing the processed first sensor signal and the processed second sensor signal, respectively, in form of data updated in accordance with the processing clock signal.

The processing clock signal can be generated by a suitable clock generator in the sensor module. In some embodiments, the processing clock signal has a fixed clock frequency, which can be suitably adapted to the concrete application. The clock frequency may be chosen for example to be at least 100 Hz, or at least 500 Hz. As the case may be, the clock frequency can be chosen higher. In an embodiment, the clock frequency is less than 10 kHz, in particular less than 5 kHz.

In some embodiments, each of the first and second digital processing devices is adapted to receive a second processing clock signal and reads digital output values from outputs of the ADCs in accordance with the second processing clock signal. The clock frequency of the second processing clock signal may be chosen higher than that of the processing clock signal (e.g. by a factor of "n", wherein n is an integer in the range of 5 to 50). In that case, the digital processing devices can foresee for example a calculation of average values (e.g. moving averages) of the ADC outputs, wherein these average values are used in a subsequent calculation of the digital signals SS1', SS2'.

In some embodiments, the control device is adapted to generate the sensor module signal in form of digital data at least containing a data element representative of the processed first sensor signal and a data element representative of the processed second sensor signal.

In some embodiments, the control device can be adapted to generate the sensor module signal as an analog signal (e.g. analog voltage signal), or to convert a digitally generated sensor module signal into an analog signal, so that finally an analog module signal is provided (at an output terminal or output interface) by the sensor module. In such case, the control device of the sensor module preferably comprises an output driver for amplification of the analog sensor module signal.

In some embodiments, the control device can be adapted to generate the sensor module signal comprising information representative of the physical quantity (e.g. a pressure or a temperature), which information has been determined by the control device based on the processed first sensor signal and the processed second sensor signal, without providing both the information representative of the processed first sensor signal and the information representative of the processed second sensor signal in the outputted sensor module signal.

In some embodiments, the control device is adapted to generate the sensor module signal in form of digital data according to a customer specific protocol. In some embodiments, this protocol used to generate the sensor module signal in form of digital data is a common standard protocol, as e.g. the SENT ("Single Edge Nibble Transmission") protocol. In some embodiments, a CAN ("Controller Area Network") protocol or a LIN ("Local Interconnect Network") protocol is used.

In some embodiments, a method for providing a sensor module signal comprising information representative of a physical quantity measured by means of a sensor module comprises:
provides a first sensor signal representative of the physical quantity, and processing the first sensor signal to provide a processed first sensor signal,
providing a second sensor signal representative of the physical quantity, and processing the second sensor signal to provide a processed second sensor signal,
generating the sensor module signal based on the processed first sensor signal and the processed second sensor signal,
checking the sensor module signal, the processed first sensor signal and the processed second sensor signal for coherency, and providing a check result signal representative of a result of the check.

The embodiments and specific details described here for the sensor modules can be provided, in an analogous manner, individually or in any possible combination, as embodiments or specific details of the methods, and vice versa. For example, in the methods described herein, the first and second sensor signals can be provided as analog signals (e.g. analog voltage signals).

In some embodiments, a method includes:
the processing of the first sensor signal comprises a first calibration for providing an amplified first sensor signal and a first analog/digital conversion of the amplified first sensor signal into a digital first sensor signal, and
the processing of the second sensor signal comprises a second calibration for providing an amplified second sensor signal and a second analog/digital conversion of the amplified second sensor signal into a digital second sensor signal.

In some embodiments, the method includes:
the processing of the first sensor signal further comprises a first digitally processing the digital first sensor signal to provide the processed first sensor signal, and
the processing of the second sensor signal further comprises a second digitally processing the digital second sensor signal to provide the processed second sensor signal.

In some embodiments, the first digitally processing and the second digitally processing is in each case conducted with use of a processing clock signal, wherein the processed first sensor signal and the processed second sensor signal, respectively, is provided in form of data, which are updated in accordance with the respective processing clock signal.

In some embodiments, the processing clock signals for the first and second digital processing devices (generally, the plurality of digital processing devices) have the same clock frequency. In some embodiments, the processing clock signals are not generated by a common clock generator (oscillator). Rather, for redundancy reason, some embodiments use independent clock generators for different digital processing devices.

In some embodiments, the generation of the sensor module signal provides the sensor module signal in form of digital data at least containing a data element representative of the processed first sensor signal and a data element representative of the processed second sensor signal.

In some embodiments, the generation of the sensor module signal provides the sensor module signal in form of digital data containing at least one data element representative of the physical quantity measured by means of the sensor module and at least one data element constituting a checksum of the first mentioned data element and/or constituting a running counter.

In some embodiments, the generation of the sensor module signal provides the sensor module signal in form of digital data according to a standard protocol, as e.g. the SENT protocol.

In some embodiments, the devices used for processing digital signals can be implemented by means of a software-controlled computing device (e.g. microcontroller) and/or a PLD, CPLD or FPGA device. Alternatively, these devices for processing digital signals are implemented as ASIC ("application-specific integrated circuit"), in particular e.g. via semiconductor masks hardwired logic fields.

In some embodiments, the methods and systems described herein can be used in many fields in which a sensor system comprising a sensor module and an associated receiving device is needed, wherein the system has to fulfill high safety requirements. In some embodiments, high demands on the security of the redundant information transmission can be met. For example, in the case of using the sensor module according to the invention in a motor vehicle, requirements with respect to an "ASIL level" or with respect to "OBD" (self-diagnosis) can be fulfilled.

In some embodiments, the first and second sensor signals each are representative of a pressure, e.g. a pressure of an operational fluid of a drive system of a vehicle (e.g. oil in an internal combustion engine).

In some embodiments, the first and second sensor signals each are representative of a pressure within a battery housing accommodating at least one battery cell.

In some embodiments, each of the first and second sensors is a pressure sensor formed by a microelectromechanical system (MEMS).

In some embodiments, the first and second sensor signals each are representative of a temperature within a battery housing accommodating at least one battery cell. Such a battery housing together with the battery cell(s) can for example form a battery module of a vehicle, wherein the battery module can provide for example a rechargeable electrical energy source for supplying energy for the propulsion of the vehicle (e.g. electric vehicle, hybrid vehicle, etc.).

An increase in pressure of the battery housing surrounding the battery cell(s) of electrified vehicles can be used to draw conclusions about malfunctions of the battery cell(s). For example, a temperature increase may lead to outgassing within a battery cell and thus to a significant increase in pressure and/or temperature and would thus be an indicator of impending destruction of the battery cell.

In some embodiments, the use of a sensor module (or a sensor system comprising such sensor module) as described therein for detecting a pressure (or a temperature) in a battery housing surrounding one or more battery cells of an electrified vehicle as for example a hybrid vehicle.

In some embodiments, the sensor system may be used in a vehicle, wherein the sensor system comprises: a sensor module as described therein and thusly outputting a sensor module signal; a receiving device arranged in the vehicle apart from the sensor module, for receiving the sensor module signal, and an electrical transmission line for transmitting the sensor module signal from the sensor module to the receiving device.

The system can be provided for example to detect a pressure or a temperature within a battery housing accommodating at least one battery cell.

In some embodiments, the receiving device can be adapted to conduct a plausibility check and/or an error recognition by means of analysing the received sensor module signal. Such analysing can comprise a calculation of a likelihood for plausibility of the sensor module signal and/or a likelihood of a particular error (e.g. failure or defect of one of the sensors) by means of a software-controlled computing device (e.g. microcontroller).

FIG. 1 shows a sensor module 10 for providing a sensor module signal OUT comprising information representative of a physical quantity measured my means of the sensor module 10. In FIG. 1 also shown are terminals for supplying a supply voltage VCC and an electrical ground GND to the sensor module 10. In the shown example, the sensor module 10 is used in an electrified vehicle (e.g. a hybrid vehicle), and the physical quantity measured by means of the sensor module 10 is a pressure in a battery housing surrounding at least one battery cell of a rechargeable electric battery module of the vehicle.

The sensor module 10 comprises a first sensor (pressure sensor) 12-1 for providing a first sensor signal SS1 representative of the pressure, and a second sensor (pressure sensor) 12-2 for providing a second sensor signal SS2 representative of the (same) pressure. In the example, the signals SS1, SS2 are analog (voltage) signals, and the sensors 12-1, 12-2 are formed as electronic semiconductor devices (e.g. MEMS).

The sensor module 10 further comprises a first processing device 20-1 for processing the signal SS1 and outputting a processed first sensor signal SS1', and a second processing device 20-2 for processing the signal SS2 and outputting a processed second sensor signal SS2'. In the example, the processing conducted by the processing devices 20-1, 20-2 in each case comprises a calibration, a filtering (e.g. a lowpass filtering), and an analog/digital conversion.

In the example, each of the processing devices 20-1 and 20-2 comprises a calibrating amplifier 22-1 and 22-2, respectively, an ADC (analog/digital converter) 24-1 and 24-2, respectively, and a digital processing device 26-1 and 26-2, respectively. The calibrating amplifiers 22-1, 22-2 provide for respective calibrations of the signals SS1, SS2 when supplying them to the ADCs 24-1, 24-2, such that, for example, in a normal operation of the sensors 12-1, 12-2, the amplified versions of the signals SS1 and SS2 are identical or at least approximately identical. However, within the framework of the invention, it is also possible to provide calibrations for the signals SS1, SS2, which are different to each other (which means that an identity of the signals SS1 and SS2 does not necessarily imply that the ADCs 24-1, 24-2 are supplied by identical signals at the inputs thereof.

The ADCs 24-1, 24-2 provide for analog/digital conversion of the calibrated versions of the signals SS1, SS2 and supply digital representations thereof to the digital processing devices 26-1, 26-2. The digital processing devices 26-1, 26-2 provide processed digital first and second sensor signals SS1' and SS2', which form output signals of the respective processing devices 20-1, 20-2, as shown in FIG. 1.

The above mentioned calibration of the signals SS1, SS2 can alternatively or additionally be provided by means of the digital processing devices 26-1, 26-2. Although not shown in FIG. 1, each of the first and second digital processing devices 26-1, 26-2 is adapted to receive a processing clock signal and has a digital output register for providing the processed first sensor signal SS1' and the processed second sensor signal SS2', respectively, in form of data updated in accordance with the processing clock signal.

The sensor module 10 further comprises a control device 30 for generating the sensor module signal OUT based on the signals SS1' and SS2', which are supplied by the respective digital processing devices 26-1, 26-2 to the control device 30. The control device 30 receives a controlling clock signal and has a digital input register for retrieving input data from said output register of the processing devices 20-1, 20-2 in accordance with the controlling clock signal. In an embodiment the controlling clock signal has the same frequency as the processing clock signal.

The control device 30 (e.g. microcontroller, or e.g. hardwired logic circuitry, implemented as an ASIC) has a computing unit for processing the signals SS1' and SS2', which are inputted in form of digital data retrieved from the output registers of the processing devices 20-1, 20-2. The processing is accomplished by conducting a predefined algorithm. Further, based on the result of the processing, the computing unit generates (calculates) the sensor module signal OUT in form of digital data according to a predefined protocol for data transmission (e.g. SENT protocol).

In the example, the digital data constituting the signal OUT at least contain a data element representative of digital values of the processed first sensor signal SS1' and a data element representative of digital values of the processed second sensor signal SS2'.

The sensor module 10 shown in FIG. 1 may be modified by supplementing one or more further sensors (as the shown sensors 12-1, 12-2), supplementing a corresponding plurality of processing devices (as the shown processing devices 20-1, 20-2), and using a control unit (instead of the shown control unit 30) capable for processing the resulting plurality of signals supplied to the control unit (as the shown signals SS1', SS2').

In some embodiments, the signal OUT contains also data elements representing a checksum of the data elements representative of the signals SS1', SS2' and data elements constituting a running counter. It may happen that the transmission of the signals SS1', SS2' from the outputs (e.g. digital registers or FIFO output registers) of the processing devices 20-1, 20-2 to the input (e.g. digital register or FIFO input register) of the control device 30 is faulty and/or that the processing of the signals SS1' and SS2' inside the control device 30 is faulty.

Such transmission and/or processing errors can be based, for example, on semiconductor defects, drifting or failed clock signals, runtime errors in a digital part. Such errors in the control device 30, for example, can cause one of the signals SS1' and SS2' to "freeze", which in sensor modules according to the prior art is then incorrectly interpreted as "defect of one of the two sensors". However, errors that affect SS1' and SS2' as part of the OUT signal in the same way (e.g. freezing both channel's information, or common offsets or falsification) cannot be identified by the receiver—they are taken as plausible, and then for example may be incorrectly interpreted by the receiving device as "no change in the measured physical quantity".

To avoid such problems, the sensor module 10 further comprises a checking device 40 for checking the sensor module signal OUT, the processed first sensor signal SS1' and the processed second sensor signal SS2' for coherency, and for providing a check result signal "EF" representative of a result of the check. The checking for coherency, that is conducted by the (additional) device 40 helps to flag in particular the above mentioned common errors (and any other errors related to the control device 30) that cannot be detected by a plausibility check conducted by the receiving device. Thus, the system and/or method implements diagnostic coverage for the control device (30) and for the transmission of the processed sensor signals (SS1', SS2') towards the control device.

In the example of FIG. 1, it is symbolized that the signal OUT is "tapped" by the checking device 40 from an output stage of the control device 30, so that the signal OUT tapped for the purpose of coherency check is not necessarily identical to the signal OUT as running over the corresponding transmission line connected to the sensor module 10. In the output stage, the signal OUT can be modified, for example, according to a standardized transmission protocol (e.g. SENT protocol), e.g. by inserting checksum data elements etc.

However, as symbolized in FIG. 1 by a dashed line, the signal OUT can also be tapped by the checking device 40 from an output of the sensor module 10, such that the signal OUT tapped for the purpose of coherency check is identical to the signal OUT as running over the transmission line to the receiving device.

In some embodiments, with a checking device as the shown checking device 40, a further redundancy-generating device is integrated in the sensor module (10), which can compare for example on the one hand the values of the pressures measured with the sensors (12-1, 12-2) as contained in a digital data signal (OUT) generated by the control device (30) and thus to be transmitted with on the other hand the desired ("correct") output values stored in digital output registers of the processing devices (26-1, 26-2). In the shown example, the checking device 40 is adapted to provide the check result signal EF at an output of the sensor module 10, which is provided separate from an output of the sensor module 10 for the sensor module signal OUT. In that case, the check result signal EF for example can be transmitted via a separate transmission line to the receiving device (which also receives the signal OUT).

In some embodiments, the check result signal EF can also be supplied to the control device 30, so that the control device 30 can react, if the signal EF indicates an error as the result of the coherency check. A reaction in such error condition can be for example an insertion of error flags into the digital output signal OUT. Alternative reactions can be for example a falsification of checksums and/or running counters contained in the output signal OUT. A further reaction may be a prevention of the sending of a current data telegram or future data telegrams from the sensor module 10 to the receiving device.

In the example, the components 20-1, 20-2, 30 and 40 are formed by electronic semiconductor devices (integrated circuits), powered by the electrical supply VCC, GND of the sensor module 10. Preferably, in the invention, these components are commonly formed by a monolithic integrated circuit, which may also comprise the respective sensors (12-1, 12-2), or which may be connected via wires to the respective sensors (12-1, 12-2).

In summary, the teachings herein and the described embodiments provide a sensor module and a method for providing a sensor module signal, which can be used in a transmission of sensor signal information from the sensor module to a receiving device apart from the sensor module, but connected via a transmission channel (e.g. electrical digital transmission line). This allows for a high degree of diagnostic coverage in sensor systems, in which a plurality of redundantly acquired sensor signals are processed and then combined to a single output signal, which is transferred from the sensor module to a receiving device. In some embodiments, the sensor module (and a receiving device connected therewith) can be arranged for example in a vehicle.

Figure 2:
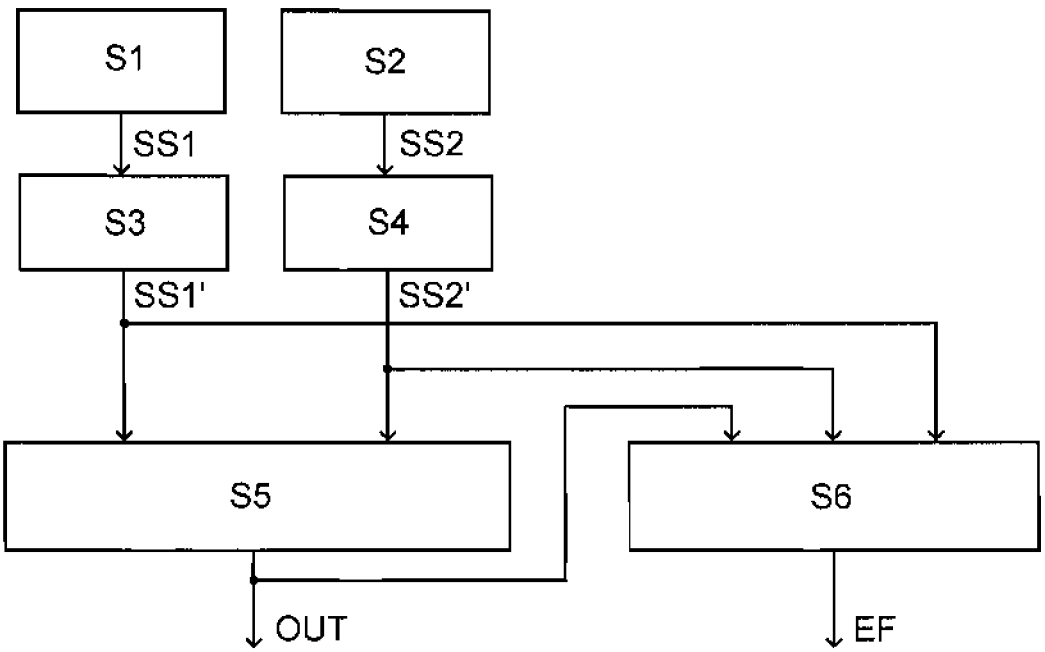
FIG. 2 shows a flowchart of a method for providing a sensor module signal incorporating teachings of the present disclosure.

FIG. 2 shows a schematic flowchart of a method incorporating teachings of the present disclosure (and as implemented e.g. by the sensor module 10 in FIG. 1), comprising: providing a first sensor signal SS1 (step S1) and providing a second sensor signal SS2 (step S2); processing the first sensor signal SS1 (step S3) and processing the second sensor signal SS2 (step S4) to provide processed first and second sensor signals SS1' and SS2'; generating a sensor module signal OUT (step S5) based on the processed first and second sensor signals SS1' and SS2'; and checking the sensor module signal OUT, the processed first and second sensor signals SS1', SS2' for coherency to provide a check result signal "EF" representative of a result of the check.

What is claimed is:

1. A sensor module for providing a sensor module signal comprising information representative of a physical quantity measured by the sensor module, the sensor module comprising:
   a first sensor providing a first sensor signal representative of the physical quantity;
   a first processing device processing the first sensor signal to provide a processed first sensor signal;
   a second sensor providing a second sensor signal representative of the physical quantity;
   a second processing device processing the second sensor signal to provide a processed second sensor signal;
   a control device generating the sensor module signal based at least on the processed first sensor signal and the processed second sensor signal; and
   a checking device checking the sensor module signal, the processed first sensor signal, and the processed second sensor signal for coherency such that the sensor module signal has a plausibility in view of the processed first sensor signal and the processed second sensor signal, and providing a check result signal representative of a result of the check,
   wherein the check result signal is provided to the control device such that the control device reacts to the check result signal when the check result signal indicates an error condition.

2. The sensor module according to claim 1, wherein the first and second sensors produce analog signals.

3. The sensor module according to claim 2, wherein:
   the first processing device comprises a first calibrating amplifier providing an amplified first sensor signal and a first ADC for analog/digital conversion of the amplified first sensor signal into a digital first sensor signal; and
   the second processing device comprises a second calibrating amplifier providing an amplified second sensor signal and a second ADC for analog/digital conversion of the amplified second sensor signal into a digital second sensor signal.

4. The sensor module according to claim 3, wherein:
   the first processing device further comprises a first digital processing device digitally processing the digital first sensor signal to provide the processed first sensor signal; and
   the second processing device further comprises a second digital processing device for digitally processing the digital second sensor signal to provide the processed second sensor signal.

5. The sensor module according to claim 4, wherein the first digital processing device and the second digital processing device are both adapted to receive a processing clock signal and each comprise a respective digital output register for providing the processed first sensor signal and the processed second sensor signal as data updated based on the processing clock signal.

6. The sensor module according to claim 1, wherein the control device generates the sensor module signal as digital data containing a first data element representative of the processed first sensor signal and a second data element representative of the processed second sensor signal.

7. The sensor module according to claim 1, wherein the control device generates the sensor module signal as digital data containing a first data element representative of the physical quantity measured by the sensor module and a second data element constituting a checksum of the first data element and/or a running counter.

8. The sensor module according to claim 1, wherein the control device generates the sensor module signal as digital data according to a SENT protocol, a CAN protocol, or a LIN protocol.

9. The sensor module according to claim 1, wherein the checking device provides the check result signal at a first output terminal of the sensor module separate from a second output terminal of the sensor module for the sensor module signal.

10. A method for providing a sensor module signal comprising information representative of a physical quantity measured by means of a sensor module, the method comprising:
    measuring a first sensor signal with a first sensor representative of the physical quantity;
    processing the first sensor signal with a first processing device to provide a processed first sensor signal;
    measuring a second sensor signal with a second sensor representative of the physical quantity;
    processing the second sensor signal with a second processing device to provide a processed second sensor signal;
    generating the sensor module signal with a control device based on the processed first sensor signal and the processed second sensor signal;
    checking, with a checking device, the sensor module signal, the processed first sensor signal, and the processed second sensor signal for coherency such that the sensor module signal has a plausibility in view of the processed first sensor signal and the processed second sensor signal;
    providing, to the control device, a check result signal representative of a result of the check; and
    reacting, by the control device, to the check result signal when the check result signal indicates an error condition.

* * * * *